Dec. 25, 1962 J. A. KRISTY ETAL 3,070,789

SPLIT-BIT ENCODER DISC

Filed Sept. 28, 1959

INVENTORS
JOHN A. KRISTY
MERRITT C. WALDRON

BY Henry L. Shenier

ATTORNEY

1

3,070,789

SPLIT-BIT ENCODER DISC

John A. Kristy, Fairfield, and Merritt C. Waldron, Milford, Conn., assignors to United Aircraft Corporation, East Hartford, Conn., a corporation of Delaware Filed Sept. 28, 1959, Ser. No. 842,962
2 Claims. (Cl. 340—347)

Our invention relates to a split-bit encoder disc and more particularly to an improved analogue-to-digital converter encoder disc which is approximately half the size of an encoder disc of the prior art providing the same resolution.

Patent No. 2,873,440 issued February 10, 1959, to Jack B. Speller discloses an analogue-to-digital converter including an encoder disc carrying rows of intermeshing conductive segments corresponding respectively to the digital output bit places from most significant to next-to-least significant. One set of alternate segments of a row corresponds to the bit output in that digital output place while the other set of segments of the row corresponds to the complement output in that digital output place. Respective pairs of brushes contact the segments of the rows to transfer signals from row to row to cause the converter to produce an output which is a digital representation of the relative position of the disc with respect to the member carrying the brushes.

It is desirable that the diameter of the encoder disc in the converter disclosed in the Speller patent as well as in other converters be as small as is possible within the limits imposed by the resolution required of the device. In a converter of the type disclosed in the Speller patent the minimum disc diameter is limited by the size of the intermeshing conductive segments and by the width of the necessary insulation between adjacent segments in the row corresponding to the next-to-least significant bit place and in other rows in increasing order of significance.

We have invented an improved encoding disc which is substantially reduced in diameter as compared with a disc of the type known in the prior art affording the same resolution. Our disc provides a substantially greater resolution than a disc of the prior art having the same diameter as our improved disc. Our disc accomplishes this result without sacrificing any of the advantages of analogue-to-digital converters of the type known in the prior art.

One object of our invention is to provide an improved analogue-to-digital converter encoding disc which is substantially smaller than a disc of the prior art providing the same resolution.

Another object of our invention is to provide an improved encoder disc which provides substantially greater resolution than does an encoder disc of the prior art of the same size.

A further object of our invention is to provide an improved encoder disc which is substantially smaller than encoder discs of the prior art without sacrificing any of the advantages of analogue-to-digital converters of the prior art.

Other and further objects of our invention will appear from the following description:

In general our invention contemplates the provision of an encoder disc carrying a pair of complementary, radially-separated rows of segments corresponding respectively to the next-to-least significant bit and to the next-to-least significant complement of the digital output of a converter incorporating our disc.

In the accompanying drawings which form part of the instant specification and which are to be read in conjunction therewith and in which like reference numerals are used to indicate like parts in the various views:

2

Figures 1, 3:
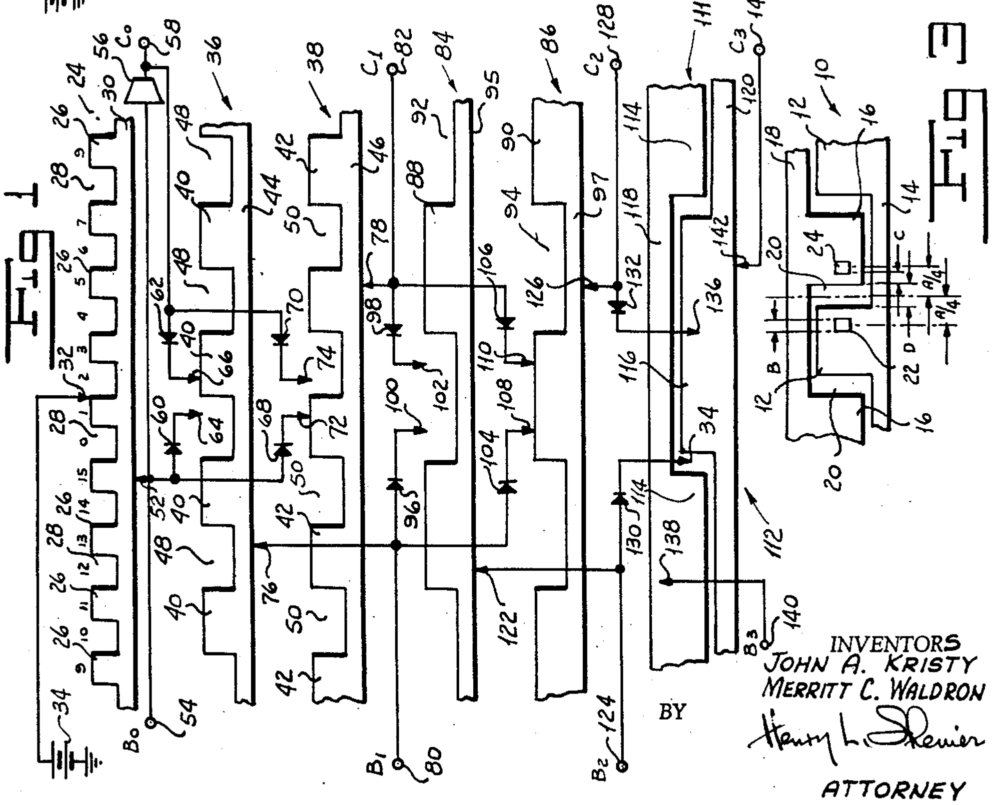
FIGURE 1 is a developed view of one form of our split-bit encoder disc.
FIGURE 3 is a fragmentary sectional view of an analogue-to-digital converter encoder disc.

Referring more particularly to FIGURE 3 of the drawings, one row indicated generally by the reference character 10 of an analogue-to-digital converter encoder disc includes a first plurality of conducting segments 12 carried by a slip ring 14. A second plurality of segments 16 carried by a second slip ring 18 intermesh with the segments 12. Insulating spaces 20 separate adjacent pairs of segments 12 and 16. A pair of brushes 22 and 24 contact segments 12 and 16 of the row 10.

As is explained in detail in the Speller patent referred to hereinabove, if the theoretical length of a segment of a particular row such as the row 10 is a distance A, then the space between the pair of brushes such as brushes 22 and 24 associated with that row is $A/2$. Let B equal the width of the brush pad of brushes 22 and 24, C be the minimum distance of the edge of a brush 22 or 24 from the edge of a segment with the brushes symmetrically disposed about a center line between two adjacent segments and D be the width of the insulation in the space 20 separating a pair of adjacent segments. The width D must be greater than the brush pad width B plus a safety factor to prevent a brush transferring from one segment to the adjacent segment from bridging the two segments. That is, D should be selected so that:

(1) $$D=B+2C$$

From FIGURE 3 it will be apparent that:

(2) $$A/4=D/2+C+B/2$$

or (3) $$A=4(B+2C)$$

From Equation 3, knowing the maximum pad width the minimum distance C can be determined and, from these quantities, the segment length A can be calculated. Once the segment length has been calculated, the circumference of the disc circle may readily be calculated.

It will be apparent from the description hereinabove that the necessity for providing the insulating spaces 20 between adjacent segments 12 and 16 of the row of intermeshing segments imposes a limitation on the size of the segments of any particular row to a size which is less than the theoretical segment size. In places of lesser significance and particularly in the output bit place of next-to-least significance, the intersegmental insulation occupies an appreciable percentage of the row circumference. This fact necessitates the provision of a disc having a greater diameter than that of a disc having a diameter equal to that of a circle the circumference of which is equal to the number of segments in a row times the calculated theoretical segment width for that row.

Referring now to FIGURE 1, one form of our split-bit encoder disc carries a least significant row indicated generally by the reference character 24 of segments 26 separated by nonconductive spaces 28. A slip ring 30 connects all the segments 26. A brush 32 is positioned to apply the potential of a suitable source such as a battery 34 to the segments of row 26. As is explained more fully in the Speller patent, the brush 32 as well as the other brushes to be described hereinafter is carried by one of a pair of relatively movable members such for example as a stationary brush holder. The segments 26 and the slip ring 30 as well as the other segments and slip rings to be described hereinafter are carried by the other of a pair of relatively movable members such for example as a disc driven by a shaft whose position is to be represented by the digital output of the converter.

Our disc includes a pair of radially separated complementary rows indicated generally by the reference characters 36 and 38 of segments 40 and 42. Respective slip rings 44 and 46 connect the segments 40 of row 36 and connect the segments 42 of the row 38. We so arrange the rows 36 and 38 that the segments 42 of row 38 are aligned with the intersegmental spaces 48 of row 36 and such that the segments 40 of the row 36 are aligned with the intersegmental spaces 50 of the row 38. A brush 52 connected to an output terminal 54 provides the least significant bit output $B_0$. An inverting amplifier 56 connected between brush 52 and an output terminal 58 provides the least significant complement $C_0$ of the output. The inverting amplifier 56 always produces an output at terminal 58 which is equal in magnitude and opposite in polarity to the output at terminal 54 connected directly to brush 52.

Respective isolating diodes 60 and 62 connect the brush 52 and the output terminal of amplifier 56 to a pair of spaced brushes 64 and 66 associated with the row 36 of segments 40. Isolating diodes 68 and 70 connect brush 52 and the output terminal of amplifier 56 respectively to brushes 72 and 74 associated with the row 38 of segments 42. Respective brushes 76 and 78 contacting slip rings 44 and 46 are connected to terminals 80 and 82 to provide the next-to-least significant bit and the next-to-least significant complement at the respective terminals.

Our disc carries respective rows indicated generally by the reference characters 84 and 86 of segments 88 and 90. The segments 90 of row 86 are aligned with the intersegmental spaces 92 of row 84 while the segments 88 are aligned with the intersegmental spaces 94 of the row 86. We connect respective slip rings 95 and 97 to the segments 88 of row 84 and to the segments 90 of row 86. Respective isolating diodes 96 and 98 connect brushes 76 and 78 to brushes 100 and 102 adapted to engage the segments 88 of row 84. Respective isolating diodes 104 and 106 connect brushes 76 and 78 to brushes 108 and 110 adapted to engage the segments 90 of the row 86.

From the structure thus far described, it will be apparent that the pair of rows 36 and 38 corresponds to the next-to-least significant output place while the pair of rows 84 and 86 corresponds to the next place in increasing order of significance. In our arrangement the segments of the pair of rows 36 and 38 do not intermesh with the result that no intersegmental insulation between a pair of adjacent intermeshing segments is required. Thus, as is explained hereinabove, the segments 40 and the segments 42 may be constructed with the calculated length of this bit place. Owing to this arrangement, for a given size of disc the segments of a particular row may be made larger than is possible with the intermeshing segment row arrangements of the prior art. In other words, for a given degree of accuracy our disc may be made substantially smaller than is possible with a disc of the prior art having intermeshing rows of segments requiring insulation between adjacent segments.

In a row having a very large number of small segments, it will be seen that our arrangement results in a very substantial saving of circumferential space. As a matter of fact, with our arrangement we are able to construct a disc which is approximately 50 percent smaller than a disc of the prior art affording the same degree of accuracy. This may readily be demonstrated for a particular case. Let us assume that the brush pad width B is a maximum of 0.010 inch and that the minimum edge distance C is 0.003 inch. Substituting these values in Equation 3, it will be seen that the circumferential length of a segment of the next-to-least significant segment row in a disc employing intermeshing segments is 0.064 inch. For a converter having a resolution of, for example, $\frac{1}{256}$ part per revolution of the input shaft, 128 segments are required for the row of the next-to-least significant bit place. Thus the circumference of this row $$C = 128 \times 0.064'' = 8.192''$$

or a row diameter of 2.6075″.

As has been explained hereinabove, in our arrangement the segments such as the segments 40 and 42 of rows 36 and 38 are not adjacent to each other and thus they require no insulating spaces 20 covering a distance D. Thus in our arrangement:

$$A/4 = (C + B/2) \tag{4}$$

or $$A = 2(2C + B) \tag{5}$$

Using the same values of $C = 0.003$ inch and $B = 0.010$ inch, we see that in our disc $A = 0.032''$. For a disc providing a resolution of $\frac{1}{256}$ per revolution, $C = 4.096''$ and the row diameter is 1.3038 inches. Thus our construction results in the provision of a disc which is approximately half the size of a disc of the prior art affording the same resolution.

In the arrangement shown in FIGURE 1, the bit corresponding to rows 84 and 86 also has been "split" to take advantage of the novel features of our construction. This arrangement may be carried through the rows of a disc in increasing order of significance until the insulation required between adjacent segments of intermeshing rows is of a relatively insignificant size with respect to the length of a segment. Following the last place in which our "split" bit arrangement is used, rows of intermeshing segments may be employed. In the form of our invention shown in FIGURE 1, we employ intermeshing rows, indicated generally by the respective reference characters 111 and 112, of segments 114 and 116 in the antepenultimate bit place. We connect a slip ring 118 to the segments 114 of row 111 and we connect a slip ring 120 to the segment 116 of row 112.

A brush 122 in engagement with the slip ring 95 applies the next-to-most significant bit $B_2$ output to a terminal 124. A brush 126 in engagement with a slip ring 97 connects the next-to-most significant complement $C_2$ to an output terminal 128. Respective isolating diodes 130 and 132 connect brushes 122 and 126 to a pair of brushes 134 and 136 adapted to engage the segments 114 and 116. A brush 138 in engagement with slip ring 118 applies the most significant bit output $B_3$ to a terminal 140. A brush 142 in engagement with the slip ring 120 couples the most significant complement $C_3$ to a terminal 144. When the disc carrying the rows 24, 36, 38, 84, 86, 110, and 112 moves relative to the brushes, output terminals 54, 80, 124, and 140 carry outputs providing a digital representation of the relative position of the segment carrying disc with respect to the member carrying the brushes. At the same time terminals 58, 82, 128, and 144 carry outputs representing the complement of the digital representation. The details of this operation will be apparent from the disclosure of the Speller patent referred to hereinabove. As is also explained in the Speller patent, the spacing between pairs of brushes corresponding to respective bit places in increasing order of significance increases to provide an increased brush spacing tolerance. Further the arrangement of transfer points is such that possible ambiguities in the output are eliminated. Our disc retains all these advantages of the construction shown in the Speller patent while effecting a substantial reduction in disc size.

Figure 2:
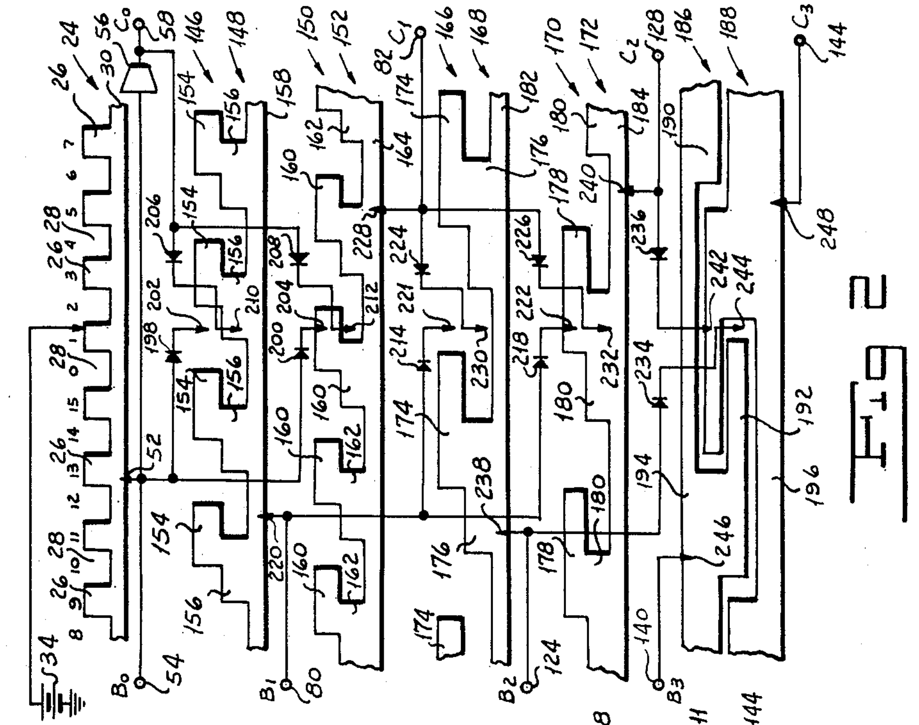
FIGURE 2 is a developed view of another form of our split-bit encoder disc.

The copending application of Merritt C. Waldron and Robert E. Di Maio, Serial No. 763,665 filed September 26, 1958, discloses an aligned brush analogue-to-digital converter which facilitates positioning of the brushes with respect to the rows of segments by providing an arrangement in which all brushes associated with segment rows are aligned in a radial direction on a disc. Referring now to FIGURE 2, we have shown a form of our split-bit encoding disc which embodies the aligning brush feature of the converter disclosed in the Waldron et al. application. In this form of our invention, the row indicated generally by the reference character 24 of segments 26 is the same as the row 24 shown in FIGURE 1. In the next-to-least significant bit place, however, four radially spaced rows, indicated generally by the respective reference characters 146, 148, 150, and 152 are provided. The rows 146, 148, 150, and 152 are made up of respective segments 154, 156, 160, and 162 separated by intersegmental spaces each equal to the length of a segment. Each of the segments 154, 156, 160, and 162 has a length which is twice the length of a segment 26.

We stagger the segments 154 of row 146 through half a segment length in the direction of the row with respect to the segments 156 of row 148. We connect a slip ring 158 to all the segments 154 and 156. We stagger the segments 160 of row 150 through half a segment length in the direction of the row with respect to the segments 162 of row 152. We connect a slip ring 164 to all the segments 160 and 162. The respective rows 146 and 148 are complementary to the rows 150 and 152. That is the segments 154 and 156 of rows 146 and 148 respectively are aligned with the intersegmental spaces of the rows 150 and 152. Similarly the segments 160 and 162 of rows 150 and 152 respectively are aligned with the intersegmental spaces of rows 146 and 148.

The form of our disc shown in FIGURE 2 includes four respective rows indicated generally by the reference characters 166, 168, 170, and 172 of segments corresponding to the next-to-most significant bit place. The rows 166, 168, 170 and 172 include respective segments 174, 176, 178, and 180 all of which have a length equal to twice the length of a segment such as 154 associated with the next-to-least significant bit place. We connect a slip ring 182 to all segments 174 and 176 and we connect a slip ring 184 to all segments 178 and 180. The arrangement of the segments of a particular row of the rows 166, 168, 170, and 172 with respect to each other and with respect to the segments and intersegmental spaces of the other rows it is the same as that described hereinabove in connection with the rows associated with the next-to-least significant bit.

Owing to the fact that our arrangement shown in FIGURE 2 requires no insulation between adjacent intermeshing segments, the length of any segment can be exactly equal to its theoretical length and thus the device embodies the same advantages as are described hereinabove in connection with the form of our invention shown in FIGURE 1. As was the case with the form of our invention shown in FIGURE 1, we "split" bits in increasing order of significance from the next-to-least significant bit until the insulating space between a pair of adjacent intermeshing segments is relatively small with respect to the length of the segment so that the problem is obviated.

For the most significant bit of the form of our invention shown in FIGURE 2, we employ two rows indicated generally by the reference characters 186 and 188 of intermeshing segments 190 and 192 connected to respective slip rings 194 and 196. This is in accordance with the disclosure of the Waldron et al. application referred to hereinabove.

Respective isolating diodes 198 and 200 connect the brush 52 associated with slip ring 30 to brushes 202 and 204 associated with rows 146 and 150 of segments 154 and 160. Respective isolating diodes 206 and 208 connect the output terminals of amplifier 56 to brushes 210 and 212 associated with rows 148 and 152 of segments 156 and 162. Respective isolating diodes 214 and 218 connect a brush 220 associated with slip ring 158 to brushes 221 and 222 associated with respective rows 166 and 170 of segments 174 and 178. Respective isolating diodes 224 and 226 connect brush 228 engaging slip ring 164 to respective brushes 230 and 232 associated with respective rows 168 and 172 of segments 176 and 180.

Respective isolating diodes 234 and 236 connect brushes 238 and 240 in engagement with slip rings 182 and 184 to brushes 242 and 244 associated with the respective rows 186 and 188 of segments 190 and 192. We connect the respective brushes 220 and 238 to the bit output terminals 80 and 124 and connect the brushes 228 and 240 to complement output terminals 82 and 128. Respective brushes 246 and 248 in engagement with slip rings 194 and 196 carry the most significant bit and most significant complement to terminals 140 and 144. The operation of the form of our invention shown in FIGURE 2 in producing a digital representation of the position of one relatively movable member with respect to the other member is explained in detail in the copending application of Waldron et al. referred to hereinabove.

In use of our invention to construct a disc embodying the advantages of our invention, we "split" bits in increasing order of significance from the next-to-least significant by separating the rows of segments associated with the bits radially. As a result the segments of each of the "split" rows may have a length which is equal to the theoretical length of segment for the bit place of significance to which the row corresponds. Thus a disc having a given resolution may be constructed with a diameter which is substantially smaller than is possible with arrangements of the prior art.

It will be seen that we have accomplished the objects of our invention. We have provided a split-bit encoding disc which is substantially smaller than a disc of the prior art affording the same resolution. Our invention permits a disc of a given size to provide a greater resolution than is possible with discs of the prior art. Our invention accomplishes its object while retaining the advantageous characteristics of analogue-to-digital converters of the prior art.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. In an analogue-to-digital converter a first circle comprising a plurality of alternate conductive segments and nonconductive spaces, the segments and spaces of the first circle having given arcuate lengths, a second circle comprising a plurality of alternate conductive segments and nonconductive spaces corresponding respectively to the nonconductive spaces and to the conductive segments of the first circle, each space of the second circle having an arcuate length equal to the arcuate length of the first circle segment to which it corresponds, each segment of the second circle having an arcuate length equal to the length of the first circle space to which it corresponds, means for coupling a pair of complementary inputs to each of the first and second circles and means for obtaining an output from each of said circles.

2. In an analogue-to-digital converter means including at least one circle of conductive segments and nonconductive spaces for producing a pair of complementary outputs, a second circle comprising a plurality of alternate conductive segments and nonconductive spaces, the segments and spaces of the second circle having given arcuate lengths, a third circle comprising a plurality of alternate conductive segments and nonconductive spaces corresponding respectively to the nonconductive spaces and to the conductive segments of the second circle, each space of the third circle having an arcuate length equal to the arcuate length of the second circle segment to which it corresponds, each segment of the third circle having an arcuate length equal to the length of the second circle space to which it corresponds, means for coupling said complementary outputs to the second and third circles and means for obtaining an output from each of the second and third circles.

References Cited in the file of this patent

UNITED STATES PATENTS 2,793,807 Yaeger ---------------- May 28, 1957